(12) United States Patent
Fienblit et al.

(10) Patent No.: US 8,407,435 B2
(45) Date of Patent: Mar. 26, 2013

(54) EFFICIENTLY CREATING A SNAPSHOT OF A LARGE CONSISTENCY GROUP USING MULTIPLE COMMANDS INCLUDING A SNAPSHOT PREPARATION COMMAND

(75) Inventors: Shachar Fienblit, Ein Ayala (IL); Sheli Rahav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 12/237,846

(22) Filed: Sep. 25, 2008

(65) Prior Publication Data

US 2010/0077142 A1 Mar. 25, 2010

(51) Int. Cl.
*G06F 12/16* (2006.01)
*G06F 13/00* (2006.01)

(52) U.S. Cl. ...................................... 711/162
(58) Field of Classification Search .................. 711/161, 711/162
See application file for complete search history.

(56) References Cited

U.S. PATENT DOCUMENTS

| | | | |
|---|---|---|---|
| 6,708,227 B1 | 3/2004 | Cabrera et al. | |
| 6,826,666 B2 * | 11/2004 | Berkowitz et al. | 711/162 |
| 6,910,112 B2 | 6/2005 | Berkowitz et al. | |
| 7,111,026 B2 | 9/2006 | Sato | |
| 7,127,577 B2 | 10/2006 | Koning et al. | |
| 7,243,198 B2 | 7/2007 | Berkowitz et al. | |
| 7,536,592 B2 * | 5/2009 | Watanabe | 714/15 |
| 7,925,631 B1 * | 4/2011 | Thillai et al. | 707/649 |
| 7,984,254 B2 * | 7/2011 | Karamanolis et al. | 711/162 |
| 2005/0033929 A1 * | 2/2005 | Burton et al. | 711/162 |

FOREIGN PATENT DOCUMENTS

JP 2003280825 * 10/2003

* cited by examiner

*Primary Examiner* — Sanjiv Shah
*Assistant Examiner* — Glenn Gossage
(74) *Attorney, Agent, or Firm* — Zilka-Kotab, PC

(57) ABSTRACT

Preparation of a snapshot for data storage includes receiving a first command to prepare to create a snapshot of a set of data stored on at least one source storage volume in a data storage system. The data storage system is prepared to expedite creation of the snapshot in response to the first command. A second command to create the snapshot is received subsequent to the first command. The snapshot is created, in response to the second command, by copying the set of data onto at least one target storage volume at an event time. The set of data may comprise a consistency group comprising a set of data blocks, and preparing the system to create the snapshot may include reserving resources, throttling an incoming data rate, starting a timer after receiving the first command, and/or copying data from a plurality of storage volumes into a memory cache.

22 Claims, 4 Drawing Sheets

EFFICIENTLY CREATING A SNAPSHOT OF A LARGE CONSISTENCY GROUP USING MULTIPLE COMMANDS INCLUDING A SNAPSHOT PREPARATION COMMAND

BACKGROUND

The present invention relates generally to data storage systems, and specifically to performing snapshots of consistency groups.

One approach to safely backing up live data is to temporarily disable write access to the live data during the backup, by stopping applications from sending data updates or by using a locking Application Programming Interface (API) provided by an operating system to enforce exclusive read access. Disabling or throttling write access is also known as quiescing Input/Output (I/O). Quiescing I/O may be tolerable for low-availability systems such as desktop personal computers and small workgroup servers. Regular downtime is acceptable for low-availability systems and is typically scheduled for weekends and for other periods of time when system usage is negligible. High-availability systems, such as those that need to run 24 hours per day, are unable to bear service stoppages.

To avoid downtime, high-availability systems may instead perform the backup on a snapshot of the data set frozen at a single point in time. The snapshot is a read-only copy of the data taken while allowing applications to continue updating their data.

The snapshot may be taken of an individual data set. A consistency group, i.e., a set of data blocks stored on at least one storage volume containing related data, can be used to help create a consistent single-point-in-time copy across one volume or multiple volumes, and even across multiple enterprise storage subsystems. Typically, the consistency group is stored on multiple storage volumes. Consistency groups may be used in a single-site environment in order to create a time-consistent copy of data that can then be backed-up and sent off site. Alternatively, consistency groups may be used in a multi-site environment to force time consistency at each remote site.

SUMMARY

An embodiment of a method is provided for data storage, which is carried out by receiving a first command to prepare to create a snapshot of a set of data stored on at least one source storage volume in a storage system. The data storage system is prepared, in response to the first command, to expedite creation of a snapshot. A second command is received, subsequent to the first command, to create the snapshot. A snapshot is created in response to the second command, by copying the set of data onto at least one target storage volume at an event time.

There is further provided, according to an embodiment of the present invention, a data storage system that includes a plurality of storage volumes, including at least one source storage volume and at least one target volume and a storage controller, which is linked to the storage volumes and is operative to receive a first command to prepare to create a snapshot of a set of data stored on the at least one source storage volume and in response to the first command, to prepare the data storage system to facilitate creation of the snapshot, to receive a second command, subsequent to the first command, to create the snapshot, and to create the snapshot in response to the second command by copying the set of data onto the at least one target storage volume at an event time.

An embodiment of the invention provides a computer software product including a tangible computer-readable medium in which program instructions are stored, which instructions, when executed by a computer, cause the computer to receive a first command to prepare to create a snapshot of a set of data stored on at least one source storage volume in a data storage system, to prepare the data storage system to facilitate creation of the snapshot in response to the first command, to receive a second command, subsequent to the first command, to create the snapshot, and in response to the second command, to create the snapshot by copying the set of data onto at least one target storage volume at an event time.

An embodiment of an apparatus for data storage includes a memory storing executable instructions; and a processor, which is linked to at least one source storage volume and at least one target storage volume, and which is operative under control of the instructions to receive a first command to prepare to create a snapshot of a set of data stored on the at least one source storage volume and in response to the first command, to prepare the data storage system to facilitate creation of the snapshot, and to receive a second command, subsequent to the first command, to create the snapshot, and to create the snapshot by copying the set of data onto the at least one target storage volume at an event time.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Figure 1:
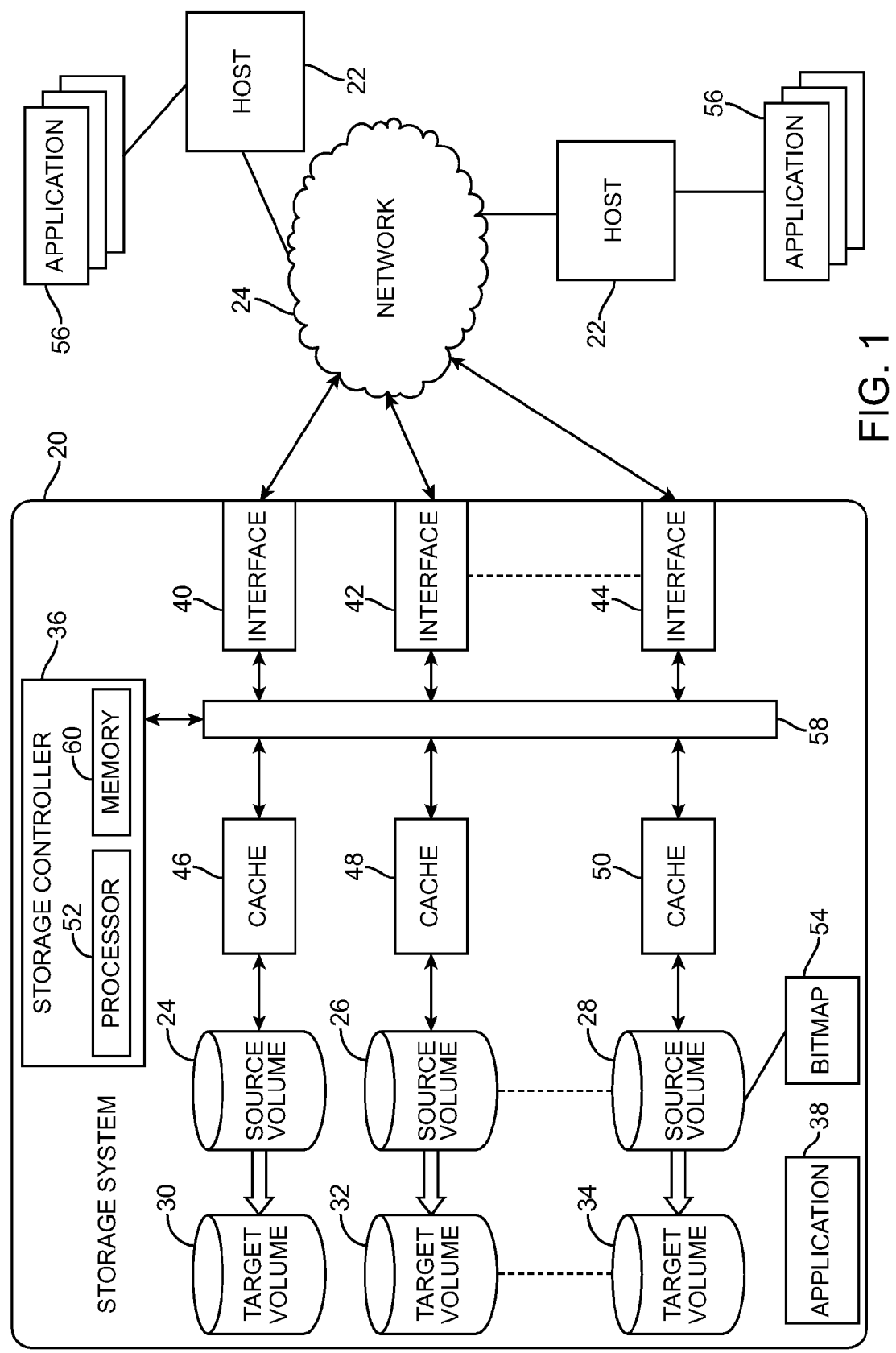
FIG. 1 is a block diagram that schematically illustrates a data storage system, in accordance with an embodiment of the present invention.

In the following description, numerous specific details are set forth in order to provide a thorough understanding of the invention. It will be apparent to one skilled in the art, however, that the present invention may be practiced without these specific details. In other instances, well-known circuits, control logic, and the details of computer program instructions for conventional algorithms and processes have not been shown in detail in order not to obscure the invention unnecessarily.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, the invention may take the form of a computer program product embodied in any tangible medium of expression having computer usable program code embodied in the medium.

Any computer-usable or computer-readable medium or combination of media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, .RF, etc.

Computer program code for carrying out operations of the invention may be written in any combination of one or more programming languages, including an object oriented programming language such as JAVA, SMALLTALK, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and block diagrams of methods, apparatus (systems) and computer program products according to embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and block diagram block or blocks.

A primary goal of data replication is to create a copy of application data in order to provide a disaster recovery solution for critical applications. Capturing the application data at an event time provides one form of data replication, an operation that is sometimes referred to herein as "taking a snapshot of the application data." The collection of data so acquired is termed a "snapshot." This operation is typically performed when backing up high-availability applications, which are required to robustly provide their functionality at all times. A common use of snapshots in large enterprise environments is creating a consistent backup of a large database or file system that spans multiple storage volumes.

Herein, the term "event time" refers to a timestamp, which delineates the latest point in time for updates to be applied to the data collected in the snapshot.

A data administrator typically takes snapshots of a set of related data, such as application data. One type of related data is a consistency group. Consistency group data is typically stored in data blocks, and data consistency is maintained by preserving the order of updates received from applications in a conservative fashion. When two simultaneous updates arrive to be applied to two different data blocks stored on two different volumes, for example, it is usually assumed that neither update is dependent upon the other. However, when a first update arrives, followed by a second update, the second update may be dependent upon successful completion of the first update. Therefore, the second update is applied only after the first update has completed successfully. Preserving the order of dependent or potentially dependent data block updates maintains consistency.

As used herein, the term "data block" refers to a sequence of bytes or bits arranged on some tangible storage medium, having a defined length, or block size.

The data administrator may take a snapshot in order to create a complete copy of the consistency group for disaster recovery purposes. In some embodiments, the storage system copies the snapshot to a separate or remote storage system. As noted above, the snapshot provides an "event-time" copy of the original data and is stored on separate physical or virtual volumes. When correctly obtained, the snapshot, or the event-time copy, provides an accurate copy of the consistency group at a specific time.

One advantage in taking snapshots is availability of a full copy of the original data in a separate data storage system. This simplifies disaster recovery, allowing restoration of critical application data within a minimal time after a disaster impacts the original data. There is a significant disadvantage, however, to taking snapshots. For large consistency groups, creating the snapshot can be time-consuming and typically lowers application performance, as data updates are usually quiesced, i.e., slowed or stopped, while the snapshot is being taken.

Taking the snapshot of a large consistency group may cause the I/O for the different volumes that store data blocks to be quiesced for a significant length of time. For high-availability systems, application performance degradation caused by I/O quiescence may be unacceptable. It is advantageous to reduce I/O quiescence when taking snapshots of the large consistency group in order to provide acceptable application performance while also providing disaster recovery.

In embodiments of the invention, the snapshot process may be split into two separate sub-processes, called using two separate commands, in order to expedite snapshot creation, and therefore, to lower the duration of I/O quiescence. The data administrator or a backup application, for example, may issue the separate commands as described hereinbelow. For the purpose of clarity, the description hereinbelow refers to the data administrator. However, those skilled in the art will understand that the separate commands may be issued by other authorized users, or automatically, such as by the backup application.

First, the data administrator issues a snapshot preparation command using a suitable interface, e.g., a graphical user interface or an API, to notify a storage controller that he or she intends to issue a snapshot creation command to take the snapshot. When the storage controller receives the snapshot preparation command for the large consistency group, the storage controller prepares the data storage system by reserving resources necessary to create the snapshot and by performing tasks that expedite the snapshot creation process.

In response to the snapshot preparation command, the storage controller prepares the data storage system using preparation methods for reducing snapshot creation time. The storage controller may throttle down an incoming data rate for storage volumes that store the data blocks. Alternatively or additionally, the storage controller may load metadata and other key snapshot information from the storage volumes into a cache. The storage controller may also reserve resources needed for performing the snapshot, such as threads, memory and disk space. Other preparation methods for reducing snapshot creation time may be employed, depending upon the architecture of the data storage system. Once the storage controller has completed preparations, it may respond to the data administrator by issuing a signal indicating completion of the preparations. Alternatively or additionally, the storage controller may respond to the data administrator using other communication methods, depending upon the architecture of the data storage system.

The data administrator issues the snapshot creation command, typically in response to receiving this signal. The storage controller then creates the snapshot for the large consistency group. The storage controller creates the snapshot quickly due to the preparations taken in response to the snapshot preparation command. The snapshot creation completes and the storage controller signals task completion to the data administrator. Preparing for the snapshot as described above prior to actually issuing the snapshot creation command decreases total I/O quiescence, expedites snapshot creation, and substantially reduces system latency.

System Description

Reference is now made to FIG. 1, which is a block diagram of a data storage system 20, in accordance with an embodiment of the invention. Data storage system 20 is connected to one or more hosts 22 by any suitable technique known in the art, for example, via a network 24 such as the Internet or by a bus (not shown). Data storage system 20 may comprise a storage controller 36, typically implemented as a processor 52 (or multiple processors) and a memory 60, which is accessible to the processor and stores executable instructions. In some embodiments, the storage controller executes a backup application 38 to administer data backup processes.

Data is stored within data storage system 20 in logical units, comprising a plurality of data blocks, which may be sequential or non-sequential. Storage controller 36 typically distributes the contents of the data blocks across a group of source storage volumes 24, 26, and 28, assumed herein to be disks by way of example. Applications 56, running on hosts 22, access the data stored on source storage volumes 24, 26, 28 via I/O requests, which comprise I/O read requests and I/O write requests. In an I/O read request, storage controller 36 reads the requested data from one of source storage volumes 24, 26, 28, wherein the data is stored. In an I/O write request, storage controller 36 writes the data to one or more source storage volumes 24, 26, 28. Storage controller 36 replicates data on a periodic basis as snapshots taken of data stored on source storage volumes 24, 26, 28. Storage controller 36 creates the snapshots on target storage volumes 30, 32, 34, as described hereinbelow.

Data storage system 20 may also comprise one or more interfaces 40, 42, 44, which receive I/O read and write requests from hosts 22, requiring access to source storage volumes 24, 26, 28. Interfaces 40, 42, 44 may be implemented in hardware and software in many combinations, and may be located in data storage system 20 or alternatively in any other suitable location, such as within an element of network 24 or one of hosts 22.

Caches 46, 48, 50 are coupled to interfaces 40, 42, 44, by any suitable fast coupling system known in the art, such as a bus (not shown) or a switch 58, as shown in FIG. 1. Each of interfaces 40, 42, 44, is able to communicate with, and transfer data to and from, any of caches 46, 48, 50, which are in turn able to transfer data to and from any of source storage volumes 24, 26, 28, as necessary. Interfaces 40, 42, 44, operate substantially independently of each other. Caches 46, 48, 50, and interfaces 40, 42, 44, operate as a data transfer system, transferring data between any of hosts 22 and source storage volumes 24, 26, 28.

Typically, a change recording bitmap 54 and metadata such as snapshot relations are stored on at least one of source storage volumes 24, 26, 28. Change recording bitmap 54 usually comprises a bit for each update made by applications 56 to data stored on source storage volumes 24, 26, 28.

Snapshots and Consistency Groups

The techniques taught in U.S. Pat. No. 6,076,148, whose disclosure is incorporated herein by reference, are suitable for using snapshots to back up information stored on storage devices 24, 26, 28 while allowing hosts 22 to continue operations during a backup operation. In brief, the patent explains that a backup bitmap includes a plurality of bits each associated with stored information tracks, and indicating a backup status of each stored track. Typically, the mass storage subsystem transfers information from each track to be backed up in order of the bits in the bit map, and after each track is backed up, it clears the bit that is associated with the track. However, when the host is to store information in the mass storage subsystem, it determines whether the bit associated with the track in which the information is to be stored is set and, if so, enables the mass storage subsystem to back up the track out of turn, and to reset the associated bit. After retrieving the information from the track, the bit associated with the track is reset, and the host stores the information in the track. By storing the information in the track, the mass storage subsystem ensures that the backed up information corresponds to the information as of the beginning of the backup operation, and in addition allows the host to continue operations during the backup operation.

Figure 2:
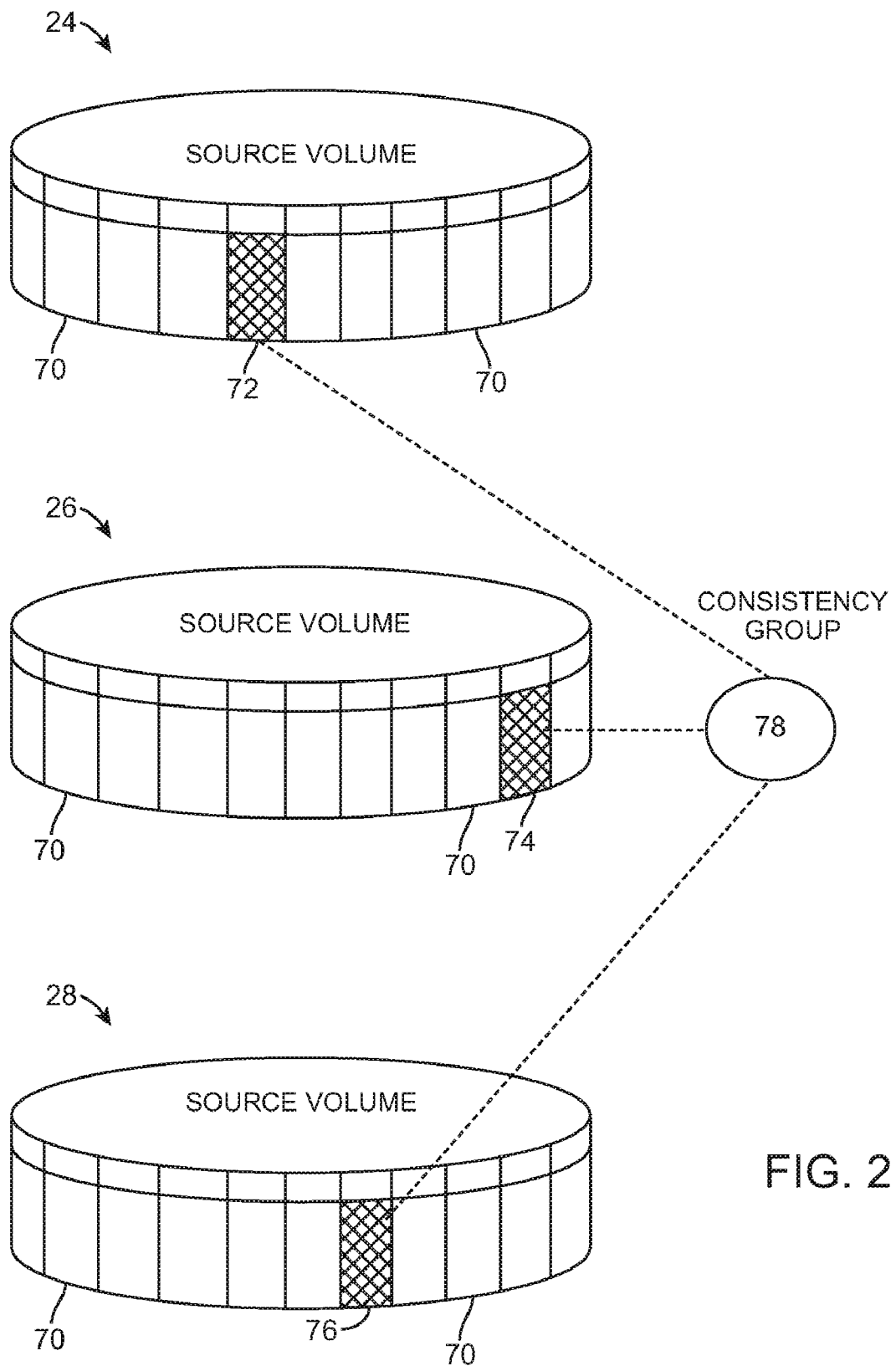
FIG. 2 is a block diagram that schematically illustrates a consistency group, in accordance with an embodiment of the present invention.

Reference is now made to FIG. 2, which is a block diagram that schematically illustrates a consistency group, in accordance with an embodiment of the present invention. Source storage volumes 24, 26, 28, comprise a plurality of data blocks 70, which may be sequential or non-sequential, such as data blocks 72, 74, 76. Data blocks 72, 74, 76 typically contain related data.

A consistency group 78 comprises data blocks 72, 74, 76, stored on source storage volumes 24, 26, 28. Each snapshot taken of consistency group 78 backs up data blocks 72, 74, 76 to target storage volumes 30, 32, 34 (FIG. 1). In some embodiments, the snapshot is replicated from target storage volumes 30, 32, 34 to a second storage system (not shown).

Embodiment 1

Figure 3:
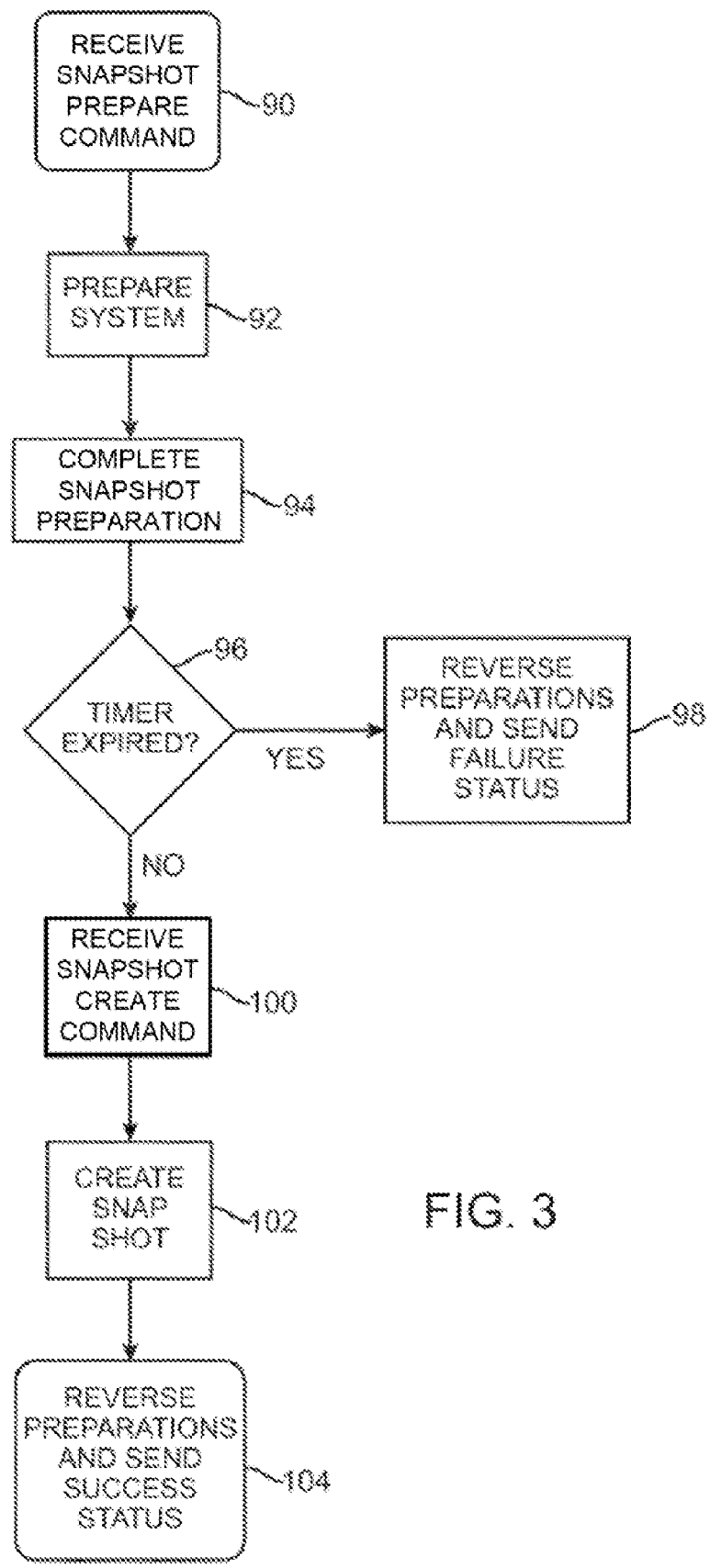
FIG. 3 is a flow chart that schematically illustrates a data backup method, in accordance with an embodiment of the present invention.

Reference is now made to FIG. 3, which is a flow chart that schematically illustrates a data backup method, in accordance with an embodiment of the present invention. In a prepare command receiving step 90, storage controller 36 (FIG. 1) receives the snapshot preparation command from the data administrator. The data administrator, for example, may send the snapshot preparation command to storage controller 36 (FIG. 1) by using any suitable technique known in the art.

In a system preparing step 92, storage controller 36 prepares data storage system 20 to create the snapshot of consistency group 78 by performing several available actions that will help reduce the time it takes to create the snapshot. Storage controller 36 performs different actions depending upon the configuration and architecture of data storage system 20.

At step 92, storage controller 36 may, for example, reserve storage system resources associated with each data block for use during snapshot creation. Examples of hardware resources that may be reserved and are associated with each data block include but are not limited to non-volatile storage space, cache space, and mailboxes. Some examples of software resources that may be reserved and are associated with each data block include but are not limited to locks, handles, recovery log space and threads.

In another option at step 92, storage controller 36 pre-fetches change recording bitmap 54 from its location on at least one of source storage volumes 24, 26, 28, into at least one of caches 46, 48, 50. Alternatively or additionally, storage controller 36 pre-fetches metadata such as snapshot relations from at least one of source storage volumes 24, 26, 28, into at least one of caches 46, 48, 50. Snapshot relations are typically connections delineating relationships between source data, such as data blocks on source storage volumes 24, 26, 28, and target data such as data blocks on target storage volumes 30, 32, 34. Similarly, other data used for snapshot creation, as will be known to those skilled in the art, may be pre-fetched from at least one of source storage volumes 24, 26, 28, into at least one of caches 46, 48, 50.

In yet another option at step 92, storage controller 36 throttles the incoming data rate from hosts 22 to interfaces 40, 42, 44. Applications 56 typically generate data streams between hosts 22 and interfaces 40, 42, 44. The data streams usually comprise data block updates with dependencies. Storage controller 36 may throttle the incoming data rate by delaying update acknowledgement messages from interfaces 40, 42, 44, to hosts 22. Storage controller 36 thereby forces applications 56 to wait to perform additional data updates until hosts 22 receive the update acknowledgement messages. Storage controller 36 thus regulates data flow between hosts 22 and interfaces 40, 42, 44.

In a preparation completion step 94, storage controller 36 starts a preparation release timer and sends a preparation status message to the data administrator. Storage controller 36 uses the preparation release timer to limit the duration of snapshot preparation activities. The preparation status message informs the data administrator that storage system 20 has completed preparations and is ready to create the snapshot. A create snapshot command is typically sent by the data administrator to the storage controller subsequent to sending the snapshot preparation command. The term "subsequent" in this context means that the create snapshot command follows the snapshot preparation command, but does not imply any particular time limit. In some embodiments, the data administrator sends the create snapshot command to the storage controller immediately after receipt of the preparation status message. Alternatively, the data administrator may send the create snapshot command to the storage controller after a delay interval or after other commands are issued. Further alternatively, the create snapshot command may be sent mandatorily when there is no preparation status message response message expected or upon failing to receive an expected preparation status message from the storage controller after expiration of a timeout interval.

In a timer expiration decision step 96, if the data administrator has failed to send the snapshot creation command prior to expiration of the preparation release timer, then in a preparation reversing and failure status sending step 98, storage controller 36 reverses snapshot preparation activities and sends a preparation failure status message to the data administrator. Examples of snapshot preparation activities reversed by storage controller 36 may include but are not limited to releasing reserved hardware and software resources and restoring the incoming data rate from hosts 22 to interfaces 40, 42, 44.

If the data administrator successfully sends the snapshot creation command prior to expiration of the preparation release timer at step 96, storage controller 36 receives the snapshot creation command from the data administrator in a create snapshot command receiving step 100.

In a snapshot creating step 102, storage controller 36 creates the snapshot of consistency group 78. As described hereinabove with reference to FIG. 2, storage controller 36 backs up blocks 72, 74, 76 from source storage volumes 24, 26, 28, to target storage volumes 30, 32, 34. The snapshot creation typically completes with a lower latency after the above preparations have been made than would otherwise have been required, since the necessary resources are immediately accessible.

In a preparation reversing and success status sending step 104, storage controller 36 reverses preparation actions and sends a creation success status message to the data administrator. Storage controller 36 backs out all snapshot preparation activities taken in system preparing step 92 to prepare data storage system 20 to create the snapshot of consistency group 78. Examples of snapshot preparation activities reversed by storage controller 36 may include but are not limited to releasing reserved hardware and software resources and restoring the incoming data rate from hosts 22 to interfaces 40, 42, 44. The creation success status message comprises a success message informing the data administrator that the snapshot of consistency group 78 has been successfully created.

Embodiment 2

Figure 4:
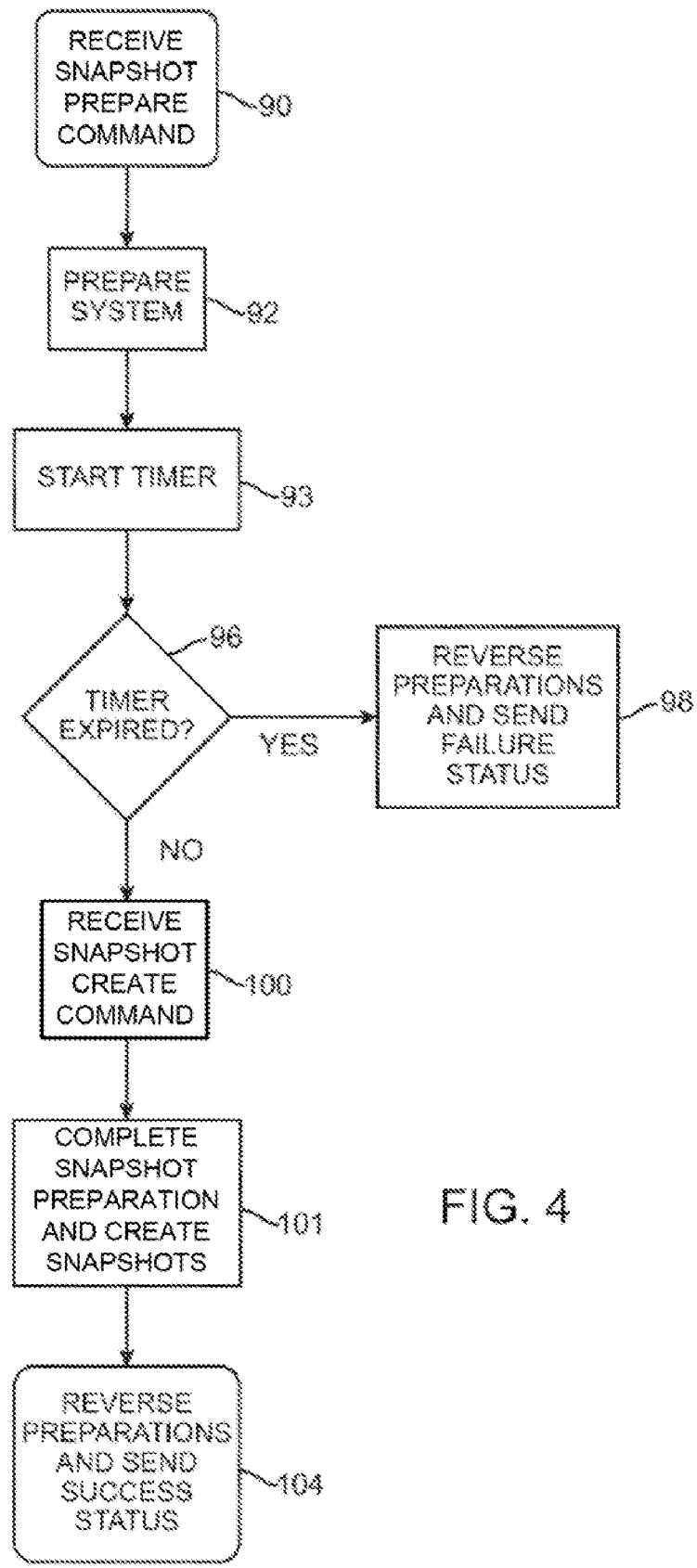
FIG. 4 is a flow chart that schematically illustrates a data backup method, in accordance with an alternate embodiment of the present invention.

Reference is now made to FIG. 4, which is a flow chart that schematically illustrates a data backup method, in accordance with an alternate embodiment of the present invention. The method is similar to the method described in reference to FIG. 3, except as described below.

After performing steps 90 and 92, storage controller 36 starts a preparation release timer in a timer starting step 93, without sending the preparation status message as in step 94 (FIG. 3). Storage controller 36 uses the preparation release timer to limit the duration of snapshot preparation activities. If the preparations take longer than the predetermined time limit, the controller proceeds at step 96 to reverse the preparations and to send a failure status message at step 98.

The create snapshot command may be received from the data administrator in step 100 prior to completion of the snapshot preparation activities. Early receipt of the create snapshot command can occur due to absence of the preparation status message. After performing steps 96 and 100, storage controller 36 completes preparations started in system preparing step 92 for reducing snapshot creation time, in a preparation completing and snapshot creating step 101.

Once the preparations are complete, storage controller 36 creates the snapshot of consistency group 78. As described hereinabove with reference to FIG. 2, storage controller 36 backs up blocks 72, 74, 76 from source storage volumes 24, 26, 28, to target storage volumes 30, 32, 34.

It will be appreciated by persons skilled in the art that the invention is not limited to what has been particularly shown and described hereinabove. Rather, the scope of the invention includes both combinations and sub-combinations of the various features described hereinabove, as well as variations and modifications thereof that are not in the prior art, which would occur to persons skilled in the art upon reading the foregoing description.

What is claimed is:

1. A method for data storage, comprising:
receiving a first command to prepare to create a snapshot of a set of data stored on at least one source storage volume in a data storage system, wherein the data storage system comprises resources;
in response to the first command, preparing the data storage system to expedite creation of the snapshot, wherein the preparing comprises:
reserving at least a portion of the resources;
starting a timer after receiving the first command; and
releasing the reserved portion of the resources when a second command is not received prior to an expiration of the timer;
receiving the second command, subsequent to the first command, to create the snapshot; and
in response to the second command, creating the snapshot by copying the set of data onto at least one target storage volume at an event time.

2. The method according to claim 1, wherein the at least one source storage volume comprises a plurality of storage volumes and the set of data comprises a consistency group comprising a set of data blocks stored on the plurality of storage volumes.

3. The method according to claim 1, further comprising sending a notification of failure to create the snapshot upon expiration of the timer.

4. The method according to claim 1, wherein the data storage system receives data at an incoming data rate, and reserving the at least a portion of resources comprises throttling the incoming data rate.

5. The method according to claim 1, wherein the reserved portion of the resources is selected from a group of resources consisting of hardware resources and software resources.

6. The method according to claim 1, further comprising:
sending a notification of successful snapshot creation upon successful creation of the snapshot; and
reversing the preparation of the data storage system.

7. The method according to claim 1, wherein the at least one source storage volume comprises a plurality of storage volumes and preparing the data storage system comprises copying data from the plurality of storage volumes into a memory cache, wherein the data comprises metadata used for snapshot creation.

8. A data storage system, comprising:
a plurality of storage volumes, including at least one source storage volume and at least one target storage volume;
resources; and
a storage controller, which is linked to the storage volumes and is operative
to receive a first command to prepare to create a snapshot of a set of data stored on the at least one source storage volume, and in response to the first command:
to prepare the data storage system to facilitate creation of the snapshot by at least:
reserving at least a portion of the resources,
starting a timer after receiving the first command, and
releasing the reserved portion of the resources when a second command is not received prior to an expiration of the timer,
to receive the second command, subsequent to the first command, to create the snapshot, and in response to the second command, to create the snapshot by copying the set of data onto the at least one target storage volume at an event time.

9. The data storage system according to claim 8, wherein the at least one source storage volume comprises a plurality of source storage volumes and the set of data comprises a consistency group comprising a set of data blocks stored on the plurality of source storage volumes.

10. The data storage system according to claim 8, wherein the storage controller is further operative to send a notification of failure to create the snapshot upon expiration of the timer.

11. The data storage system according to claim 8, wherein the data storage system receives data at an incoming data rate, and wherein the storage controller is operative to throttle the incoming data rate in preparing to create the snapshot.

12. The data storage system according to claim 8, wherein the reserved portion of the resources is selected from a group of resources consisting of hardware resources and software resources.

13. The data storage system according to claim 8, wherein the storage controller is further operative to:
send a notification of successful snapshot creation upon successful creation of the snapshot; and
reverse the preparation of the data storage system.

14. The data storage system according to claim 8, further comprising a memory cache, wherein the at least one source storage volume comprises a plurality of source storage volumes, and in preparing the data storage system the storage controller is operative to copy data from the plurality of source storage volumes into the memory cache, wherein the data comprises metadata used for snapshot creation.

15. A computer software product, comprising a non-transitory computer-readable medium in which program instructions are stored, which instructions, when executed by a computer, cause the computer to receive a first command to prepare to create a snapshot of a set of data stored on at least one source storage volume in a data storage system, the data storage system comprising resources, to prepare the data storage system to facilitate creation of the snapshot in response to the first command by at least:
reserving at least a portion of the resources,
starting a timer after receiving the first command, and
releasing the reserved resources when a second command is not received prior to an expiration of the timer, to receive the second command, subsequent to the first command, to create the snapshot, and in response to the second command, to create the snapshot by copying the set of data onto at least one target storage volume at an event time.

16. The product according to claim 15, wherein the at least one source storage volume comprises a plurality of storage volumes and the set of data comprises a consistency group comprising a set of data blocks stored on the plurality of storage volumes.

17. The product according to claim 15, wherein the instructions cause the computer to send a notification of failure to create the snapshot upon expiration of the timer.

18. The product according to claim 15, wherein the data storage system receives data at an incoming data rate, and the instructions cause the computer to reserve the at least a portion of the resources by throttling the incoming data rate.

19. The product according to claim 15, wherein the reserved resources are selected from a group of resources consisting of hardware resources and software resources.

20. The product according to claim 15, wherein the instructions cause the computer to:
send a notification of successful snapshot creation upon successful creation of the snapshot; and
reverse the preparation to create the snapshot of the set of data stored on the at least one source storage volume in the data storage system.

21. The product according to claim 15, wherein the data storage system has a memory cache, and the at least one source storage volume comprises a plurality of storage volumes, and wherein the instructions cause the computer to copy data from the plurality of source storage volumes into the memory cache, wherein the data comprises metadata used for snapshot creation.

22. Apparatus for data storage, comprising:
a memory storing executable instructions;
resources; and
a processor, which is linked to at least one source storage volume and at least one target storage volume, and which is operative under control of the instructions to receive a first command to prepare to create a snapshot of a set of data stored on the at least one source storage volume, and in response to the first command, to prepare the data storage system to facilitate creation of the snapshot by at least:
reserving at least a portion of the resources,
starting a timer after receiving the first command, and
releasing the reserved resources when a second command is not received prior to an expiration of the timer, and to receive the second command, subsequent to the first command, to create the snapshot, and in response to the second command, to create the snapshot by copying the set of data onto the at least one target storage volume at an event time.

* * * * *